(12) United States Patent
Nahum et al.

(10) Patent No.: US 11,404,913 B2
(45) Date of Patent: Aug. 2, 2022

(54) INDUCTION CHARGING FOR A PORTABLE ELECTRONIC DEVICE WITH A GRIP ATTACHMENT

(71) Applicant: PopSockets LLC, Boulder, CO (US)

(72) Inventors: Altan Nahum, Boulder, CO (US); Randy Yang Chiang, Boulder, CO (US); Judd Nutting, Boulder, CO (US)

(73) Assignee: PopSockets LLC, Boulder, CO (US)

( * ) Notice: Subject to any disclaimer, the term of this patent is extended or adjusted under 35 U.S.C. 154(b) by 0 days.

(21) Appl. No.: 17/050,095

(22) PCT Filed: Aug. 21, 2019

(86) PCT No.: PCT/US2019/047401
§ 371 (c)(1),
(2) Date: Oct. 23, 2020

(87) PCT Pub. No.: WO2020/055560
PCT Pub. Date: Mar. 19, 2020

(65) Prior Publication Data
US 2021/0367452 A1    Nov. 25, 2021

Related U.S. Application Data

(60) Provisional application No. 62/729,088, filed on Sep. 10, 2018.

(51) Int. Cl.
*H02J 50/12* (2016.01)
*H02J 50/90* (2016.01)
(Continued)

(52) U.S. Cl.
CPC ............ *H02J 50/12* (2016.02); *H02J 7/0044* (2013.01); *H02J 50/90* (2016.02); *H04B 1/3883* (2013.01); *H04M 1/0254* (2013.01); *H04M 1/04* (2013.01)

(58) Field of Classification Search
CPC ....................................................... H02J 50/12
(Continued)

(56) References Cited

U.S. PATENT DOCUMENTS

| D777,022 | S | 1/2017 | Barnett |
| D818,808 | S | 5/2018 | Barnett |

(Continued)

FOREIGN PATENT DOCUMENTS

| CN | 2 398 783 Y | 9/2000 |
| KR | 101 738 073 B1 | 5/2017 |
| WO | 2014190574 A1 | 12/2014 |

OTHER PUBLICATIONS

Transmittal of the International Search Report and Written Opinion issued in PCT/US2018/066137 dated Nov. 22, 2019.

*Primary Examiner* — Joseph Chang
(74) *Attorney, Agent, or Firm* — Irell & Manella LLP

(57) ABSTRACT

Induction charging devices and methods are disclosed for a portable electronic device that has a reception coil coupled to a power source and an outwardly projecting attachment mounted thereon. In some versions, the devices include a housing having a wall with an outwardly facing charging surface and a recess sized to receive the attachment with the portable electronic device disposed on the charging surface. In some versions, devices can include an attachment device coupled to a rear of a housing that can releasably secure to a portion of a vehicle and a mount coupled to a front of the housing configured to receive a portion of the attachment therein to secure the portable electronic device to the housing. A charging assembly within the housing can include a transmission coil disposed so that with the recess or mount receiving the attachment therein, the transmission and reception coils are sufficiently aligned to charge the power source of the portable electronic device.

7 Claims, 7 Drawing Sheets

(51) Int. Cl.
  *H02J 7/00* (2006.01)
  *H04B 1/3883* (2015.01)
  *H04M 1/02* (2006.01)
  *H04M 1/04* (2006.01)

(58) Field of Classification Search
  USPC .......................................................... 307/104
  See application file for complete search history.

(56) References Cited

U.S. PATENT DOCUMENTS

2017/0025886 A1* 1/2017 Rohmer ................ H02J 7/0044
2017/0167669 A1   6/2017 Purkiss
2020/0203975 A1* 6/2020 Sobh .................... H01R 25/003

* cited by examiner

INDUCTION CHARGING FOR A PORTABLE ELECTRONIC DEVICE WITH A GRIP ATTACHMENT

CROSS-REFERENCE TO RELATED APPLICATION

The present National Phase application claims priority to PCT/US2019/47401, filed Aug. 21, 2020, which claims priority to U.S. Provisional Patent Application No. 62/729,088, filed Sep. 10, 2018, the entire contents of which are hereby incorporated by reference.

FIELD OF THE DISCLOSURE

The present disclosure generally relates to chargers for electronic devices and, more particularly, to wireless chargers for portable electronic devices.

BACKGROUND

Wireless charging for portable electronic devices, such as smart phones, has become increasingly popular. In use, the electronic device is placed on a charging station and an electromagnetic field transfers energy from the charging station to the electronic device through electromagnetic induction. The energy is then used by the electronic device to charge a battery. Many factors can influence the effectiveness of the energy transfer, including material and space between the coils of the charging station and the electronic device Portable electronic devices can also be housed in protective covers or cases in order to protect the device from damage, provide a grip for handling the device, and/or provide a stand for propping the device on a surface. Such cases increase the effective size of the device. Further, expandable devices and accessories, which may be attached directly to the device or to the case protecting the device, are used for a variety of functions, including propping the device on a surface and providing an expandable grip for handling the device. The expandable devices have decorative buttons, which may display logos, decals, symbols, or other artistic renderings. All of these covers, cases, devices, and accessories, however, can increase the material and space between the coils of the charging station and the electronic device, as well as cause the electronic device to unstably rest on the charging station.

SUMMARY

In accordance with a first aspect, an induction charging apparatus is described that is suitable for charging a portable electronic device having a reception coil coupled to a power source and having an outwardly projecting attachment mounted thereon. The charging apparatus includes a housing that defines an interior and has a wall with an outwardly facing charging surface that is configured to receive the portable electronic device thereon for charging the power source thereof. A recess in the wall is sized to receive the attachment therein with the portable electronic device disposed on the charging surface. The charging apparatus further includes a charging assembly disposed within the housing, where the charging assembly includes a transmission coil having a main surface extending generally parallel with the outwardly facing charging surface. With this configuration, the recess can receive the attachment therein such that the transmission coil is sufficiently aligned with the reception coil to thereby charge the power source of the portable electronic device.

According to some forms, at least one dimension of the recess in a plane parallel to the charging surface can be larger than a corresponding dimension of the attachment such that the portable electronic device can be shifted on the charging surface with the attachment received within the recess to refine the alignment of the transmission coil with the reception coil. In further forms, the recess can have an elongate slot configuration or a circular shaped cross-section in the plane parallel to the charging surface.

According to additional forms, the charging apparatus can include one or more of the following aspects: the recess can include a bottom wall and a depth of the recess between the charging surface and the bottom wall can be sized to receive the attachment in the recess with the attachment spaced from the bottom wall; the transmission coil can be spaced from the charging surface a predetermined distance to create a charging zone that extends between about 10 mm and about 15 mm from the transmission coil; the transmission coil can be mounted to an interior surface of the recess; or the charging surface can include a tacky portion.

According to some versions, the housing can include a base with a bottom wall and an upstanding sidewall, the wall can include an outwardly projecting flange that is configured to rest on the upstanding sidewall and is movable with respect to the base to access the interior of the housing, and the transmission coil can be received within a housing portion coupled to the wall. In further forms, the charging assembly can further include an electrical cord having a plug at a distal end coupled to the base and a port that is coupled to the wall and is configured to receive the plug of the electrical cord to selectively provide electrical power to the transmission coil and/or the upstanding sidewall can include angled slots that are aligned across the bottom wall from one another and are sized to receive the flange of the wall therein to hold the wall at an angle.

In accordance with a second aspect, an induction charging apparatus is described that is suitable to charge a portable electronic device that has a reception coil coupled to a power source and has an outwardly projecting attachment mounted thereon. The charging apparatus includes a housing that defines an interior, an attachment device that is coupled to a rear of the housing, the attachment device being configured to releasably secure the housing to a portion of a vehicle, and a mount that is coupled to a front of the housing, the mount having an open front and defining a recess sized to receive a portion of the attachment therein to secure the portable electronic device to the mount. The charging apparatus further includes a charging assembly that is disposed within the housing. The charging assembly includes a transmission coil having a main surface that extends generally parallel with the open front of the mount, so that with the mount receiving the attachment therein the transmission coil is sufficiently aligned with the reception coil to thereby charge the power source of the portable electronic device.

According to some forms, the charging apparatus can further include one or more of the following aspects: the recess can include a slot portion that is configured to receive a portion of the attachment therein to hold the portable electronic device a predetermined distance from the housing; the mount can include retention portions that are configured to grip the attachment to hold the attachment within the mount; the transmission coil can be spaced from a front surface of the mount a predetermined distance to create a charging zone that extends between about 10 mm and about 15 mm from the transmission coil; the transmission coil can be mounted to an interior surface of a forward wall of the housing; the attachment device can include a vent attachment having a forked configuration; the attachment device can include a suction cup; the attachment device can include a wall portion having a tacky material disposed thereon; or the attachment device can include an adjustable arm.

BRIEF DESCRIPTION OF THE DRAWINGS

The above needs are at least partially met through provision of the examples described in the following detailed description, particularly when studied in conjunction with the drawings, wherein.

DETAILED DESCRIPTION

Figure 1:
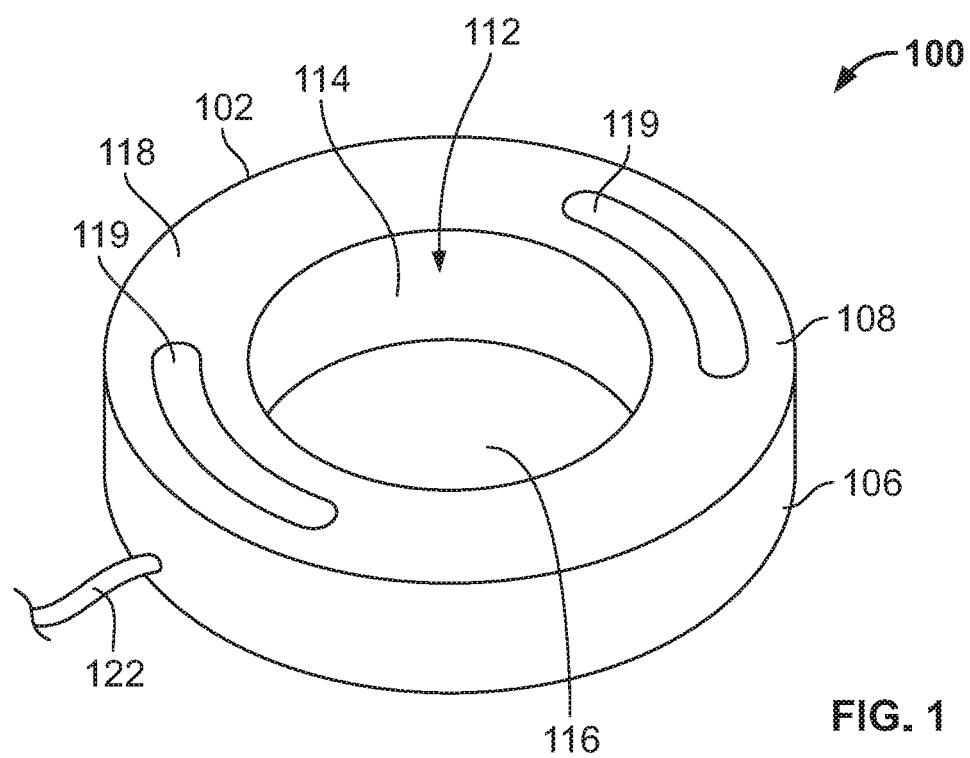
FIG. 1 is a perspective view of an induction charging device having a top wall with a first example recess therein in accordance with various embodiments.

Generally speaking, pursuant to various embodiments, induction charging devices and methods are provided that advantageously provide stable and effective charging of portable electronic devices having outwardly protruding attachments mounted thereto, such as grip attachments. In some versions, the grip attachments can be expandable devices that include a base and an expanding mechanism that is movable relative to the base between a collapsed configuration and an expanded configuration. The expandable devices may further include a button coupled to the expanding mechanism.

The embodiments described herein achieve positioning and charging of the portable electronic devices by providing a recess or mount to receive the attachment therein. Further, the coil within the charging apparatus can be configured with an expanded range relative to conventional induction charging devices to transmit energy through the attachment and any cover on the portable electronic device. In some versions, a user can adjust the portable electronic device within the recess to better align the coils for charging. In some versions, the recess has a depth to fully receive the attachment therein so that the portable electronic device rests on the charging surface.

As shown in various ones of the figures, the induction charging devices and methods described herein are configured to charge a suitable portable electronic device 10, such as a smart phone, tablet, e-reader, and the like. The portable electronic device 10 includes electronic components powered by a power source 12 and a coil 14 electrically coupled to the power source 12. The coil 14 has a disk-shaped configuration with main surfaces 16 that extends in a direction generally parallel with respect to main surfaces 18 of the device 10. The device 10 can include a grip attachment 20 secured to a rear one of the main surfaces 18 to aid a user in holding and standing the device 10, as well as other functionalities. The grip attachment 20 can be an expandable grip accessory in the form of a commercially available grip and stand product such as that available on www.popsockets.com. In such forms, the attachment 20 can have an expandable sidewall 22 with a button 24 coupled thereto. The sidewall 22 can be shifted between a collapsed, storage configuration as shown, and an expanded configuration for use.

Figure 2:
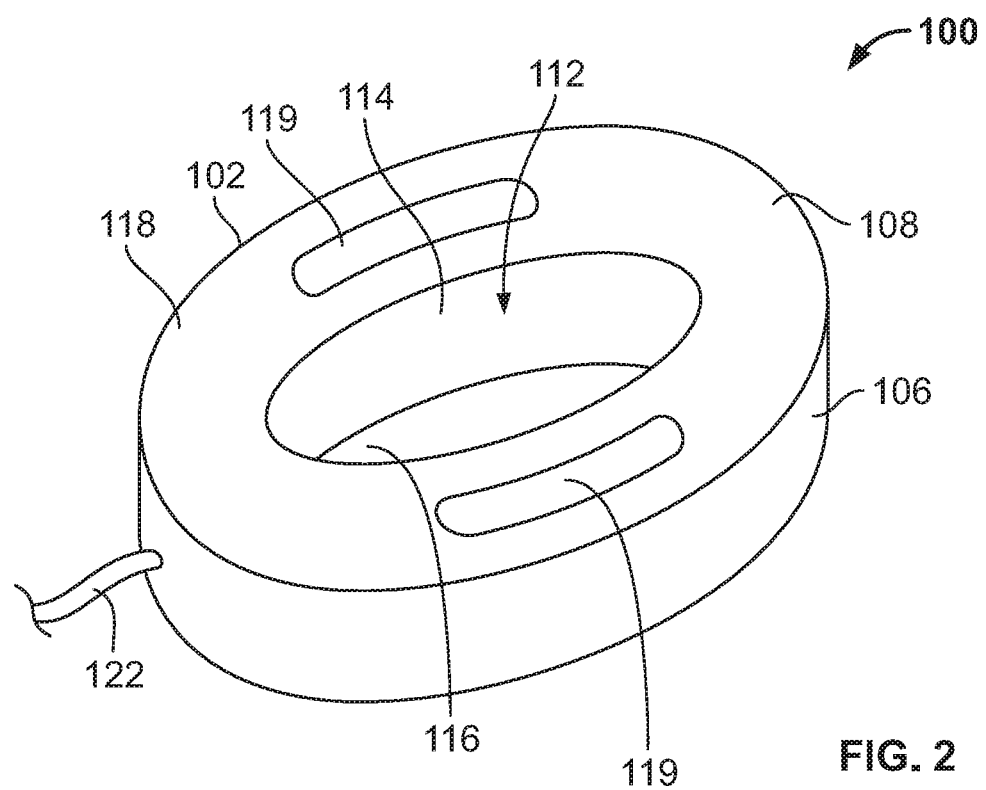
FIG. 2 is a perspective view of an induction charging device having a top wall with a second example recess therein in accordance with various embodiments.
Figure 3:
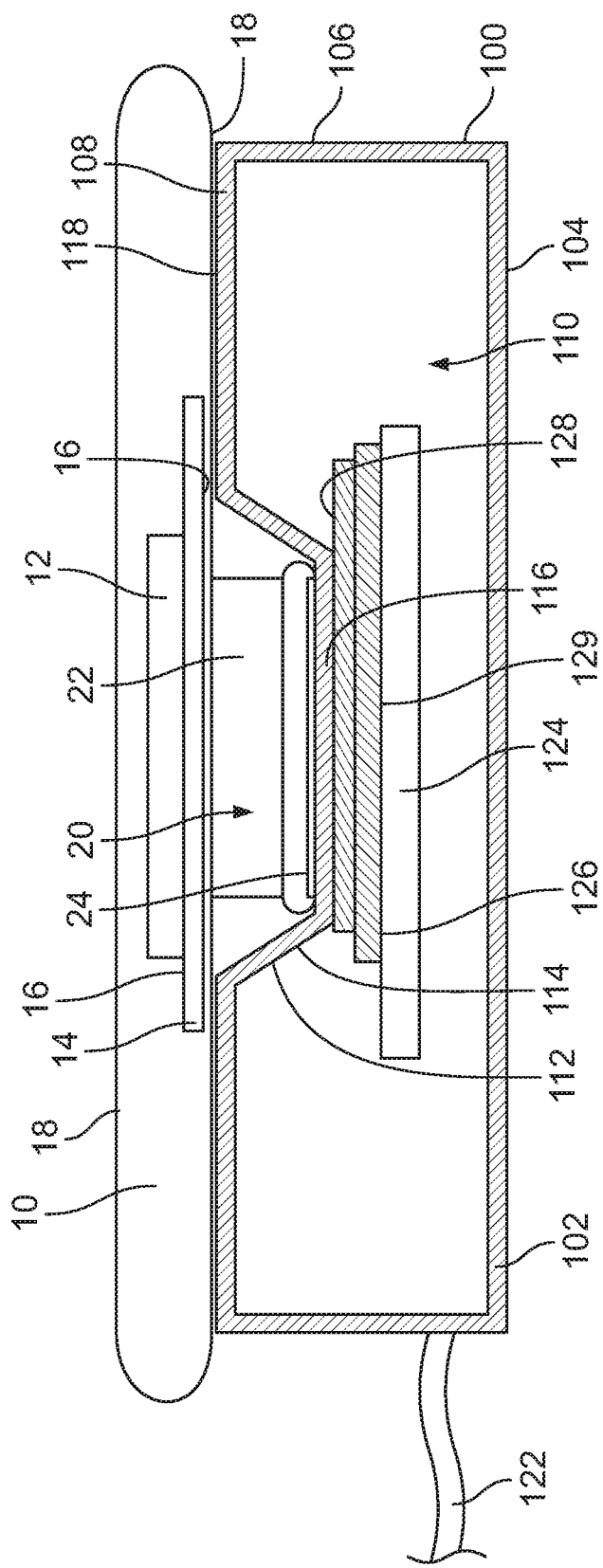
FIG. 3 is a cross-sectional view of an induction charging device in accordance with various embodiments.

A first embodiment of an induction charging device 100 is shown in FIGS. 1 to 3. The induction charging device 100 includes a housing 102 having a bottom wall 104, one or more upstanding sidewalls 106, and a top wall 108 defining an interior 110. As shown, the top wall 108 includes a recess 112 therein defined by a sidewall 114 and a bottom wall 116. The sidewall 114 can have an inwardly tapering configuration as shown in FIGS. 1 and 2 or can extend generally vertical. The top wall 108 further provides a charging surface 118 for reception of the rear surface 18 of the portable electronic device 10 thereon.

So configured, a user can place the electronic device 10 on the charging surface 118 with the attachment 20 aligned with the recess 112. The recess sidewall 114 is sized to give the recess 112 a depth sufficient to fully receive the attachment 20 therein so that the electronic device 10 stably rests on the charging surface 118. For example, the sidewall 114 can be sized to be the same as a depth of the attachment 20 or can be larger than the attachment 20 so that the button 24 is spaced from the recess bottom wall 116 by a distance, such as about 1 mm or 2 mm or in a range between 0 and about 1 mm. Other ranges can be between about 1 mm to about 2 mm or about 1 mm to about 3 mm. Further, if desired, the charging surface 118 can include a tacky portion 119, which can extend across some, such as around the recess 112 or a perimeter of the charging surface 118, or all of the charging surface 118 and can be a layer, coating, member, etc. The tacky portion 119 can be a suitable adhesive, including high and low tack adhesive, rubber, or elastomers or other polymers having tacky properties.

The recess 112 can have any suitable configuration. For example, the recess 112 can have a circular cross-section, as shown in FIG. 1, in a plane parallel to the charging surface 118. The cross-section can have a diameter slightly larger, e.g., about 2 to 5 mm, larger than a largest diameter of the attachment 20 or can have an increased diameter with respect to the largest diameter of the attachment 20 so that a user can move the electronic device 10 around on the charging surface 118 to get better alignment as discussed in more detail below. For example, the diameter of the cross-section can be larger than the attachment 20 by 5 mm, 10 mm, 15 mm, 20 mm, 25 mm, 30 mm, and so forth. In another approach, the cross-section of the recess 112 in the plane parallel to the charging surface 118 can have a track-shaped, elongate slot configuration, as shown in FIG. 2, so that a user can slide the electronic device 10 along the charging surface 118 with the attachment 20 sliding within the recess 112.

As shown in FIG. 3, the induction charging device 100 further includes an electronic assembly 120 having a power cord 122 configured to be coupled to a power source, such as an electrical wall outlet, a car outlet, or the like, a printed circuit board assembly 124, and a transmission coil 126. The components of the electronic assembly 120 can be electrically coupled together by any suitable method, including wires, traces, etc. The transmission coil 126 has a disk-shaped configuration with main surfaces 128. To charge the electronic device 100, a user aligns the coil 14 of the device 10 with the coil 126 of the charging device 100 to supply charging power to the power source 12.

The circuit board 124 and transmission coil 126 are mounted within the interior 110 of the housing 102 to extend generally parallel to the charging surface 118. In some versions, the coil 126 is mounted to an interior surface of the recess 112, as shown in FIG. 3. For example, the coil 126 can be spaced from the charging surface 118 by a distance that approximately equals the depth of the recess 112 and ranging between about 5 mm and about 20 mm, between about 7 mm and about 15 mm, between about 8 mm and about 10 mm, or about 9 mm. The spacing between the coil 126 and the charging surface 118 creates a charging zone adjacent to and spaced from the charging surface 118 to account for the body of the electronic device 10 and any cover secured over the body. For example, the spacing of the coil 126 and charging surface 118 can create a charging zone that extends between about 1 mm to about 6 mm spaced from the charging surface 118. In one form, the charging zone extends between about 10 mm and 15 mm from the coil 126. Thus, the electronic assembly 120 is configured to have a wireless charging range sufficient to transfer energy from the transmission coil 126 to the reception coil 14 of the electronic device 10 across the depth of the recess 112. If desired, the electronic assembly 120 can include shielding 129 disposed between the coil 126 and the circuit board 124 to protect the circuit board 124 during use.

As discussed above, at least one dimension of the recess 112 in a plane parallel to the charging surface 118 can be larger than a corresponding dimension of the attachment 20 such that the electronic device 10 can be shifted on the charging surface 118 with the attachment 20 received within the recess 112 to refine the alignment of the transmission coil 126 with the reception coil 14. More specifically, a diameter of the recess 112 can be, in some embodiments such as that depicted in FIG. 1, larger than a diameter of the attachment 20 such that the electronic device 10 with attachment 20 can be adjusted relative to the transmission coil 126 to obtain the necessary alignment for efficient charging to occur. In embodiments where the recess 112 is elongated such as in FIG. 2, at least the length of the recess 112 has a dimension larger than a diameter or corresponding length dimension of the attachment 20 to allow for adjustments in alignment. A width of such a slot may also be larger than a diameter or corresponding width dimension of the attachment 20 to enable adjustments laterally as well.

Figure 4:
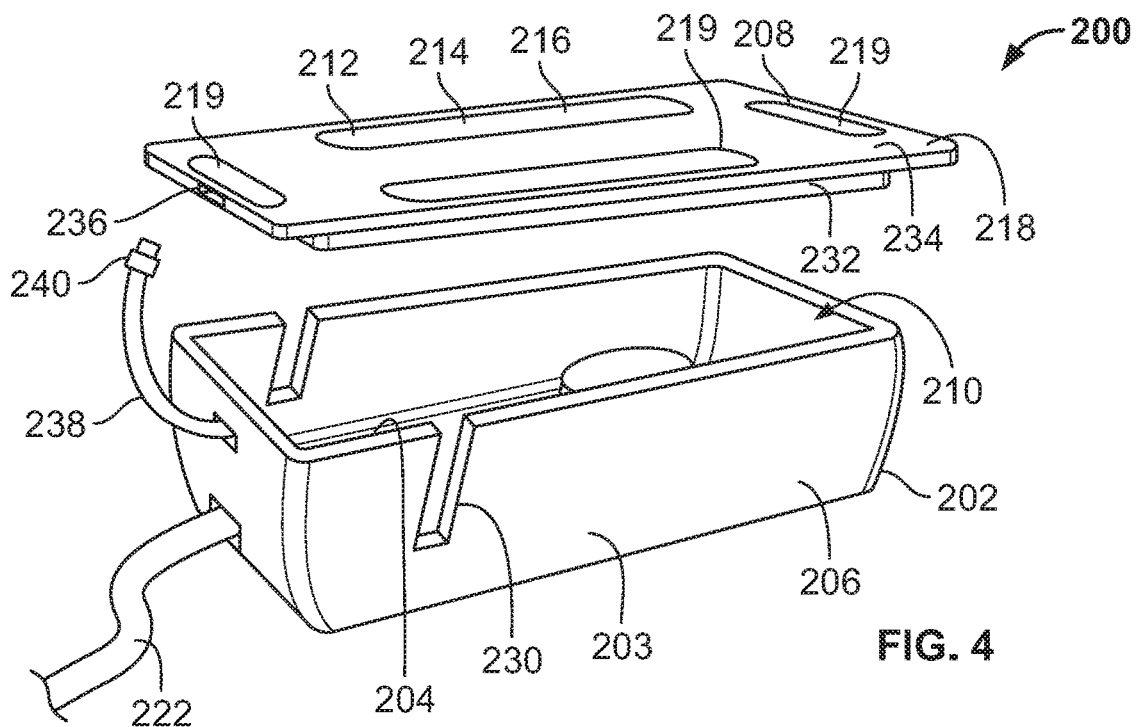
FIG. 4 is an exploded view of an induction charging device with a removable top wall in accordance with various embodiments.
Figure 5:
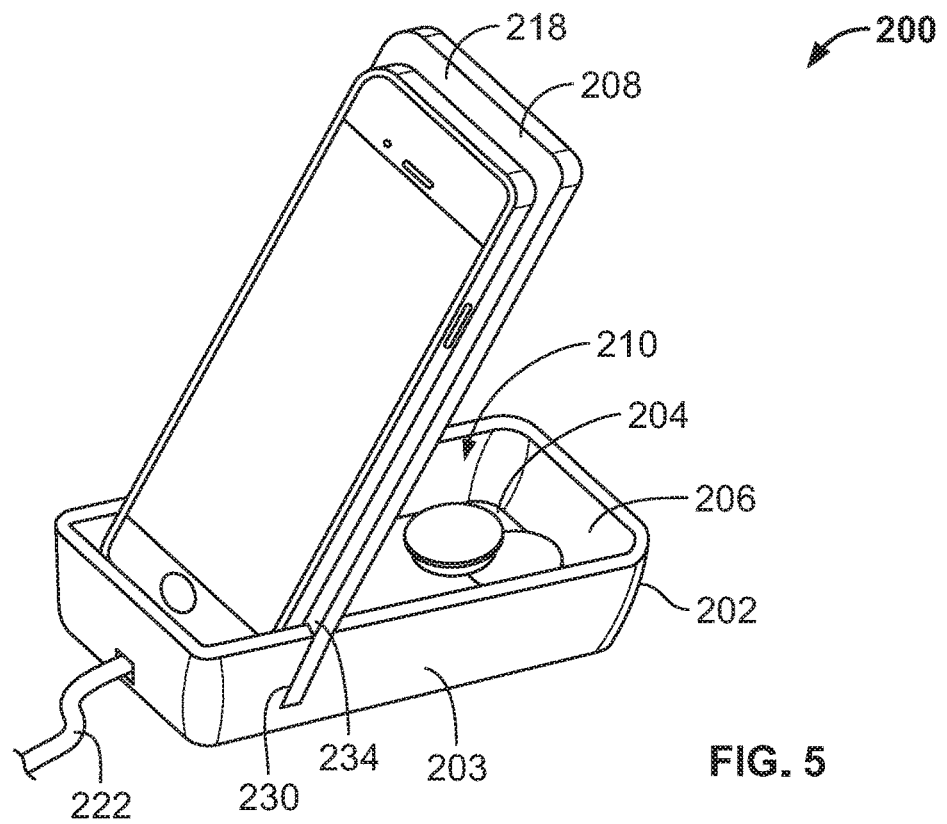
FIG. 5 is a perspective view of the induction charging device of FIG. 4 with the top wall in an upright configuration in accordance with various embodiments.
Figure 6:
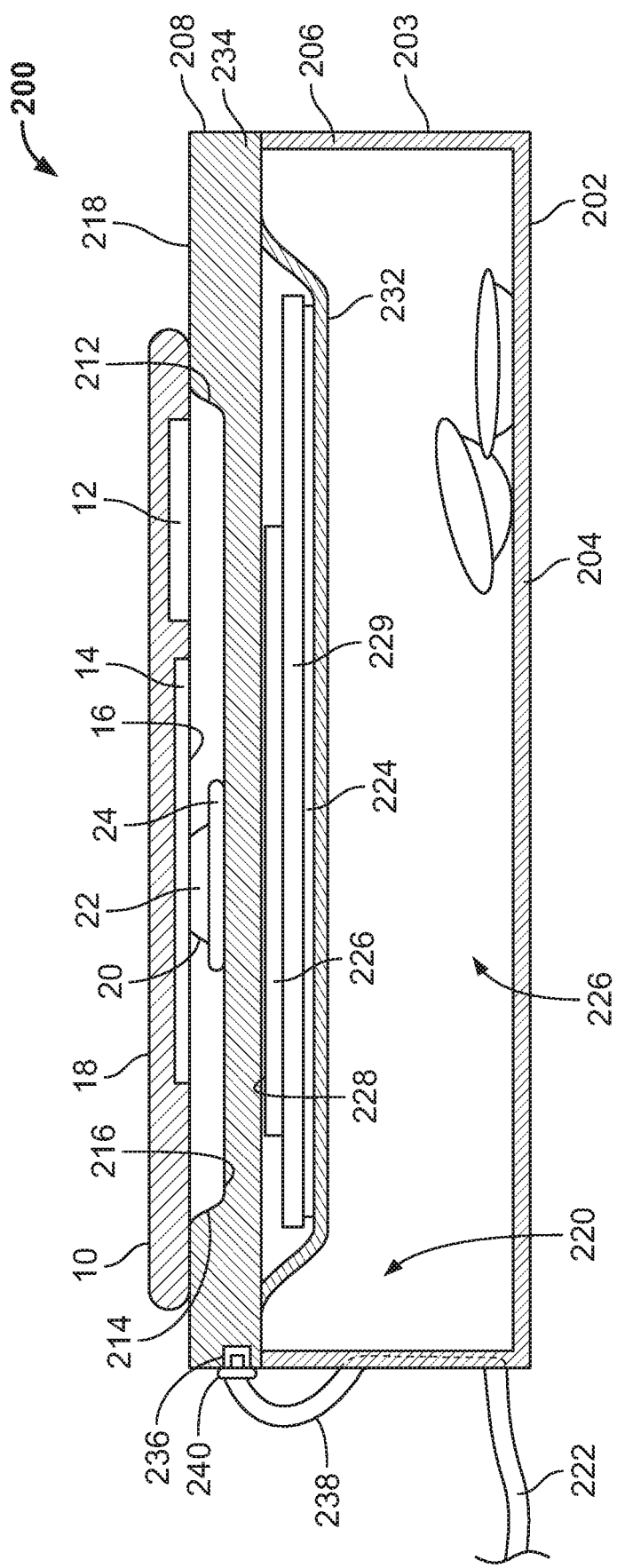
FIG. 6 is a cross-sectional view of the induction charging device of FIG. 4 in accordance with various embodiments.
Figure 7:
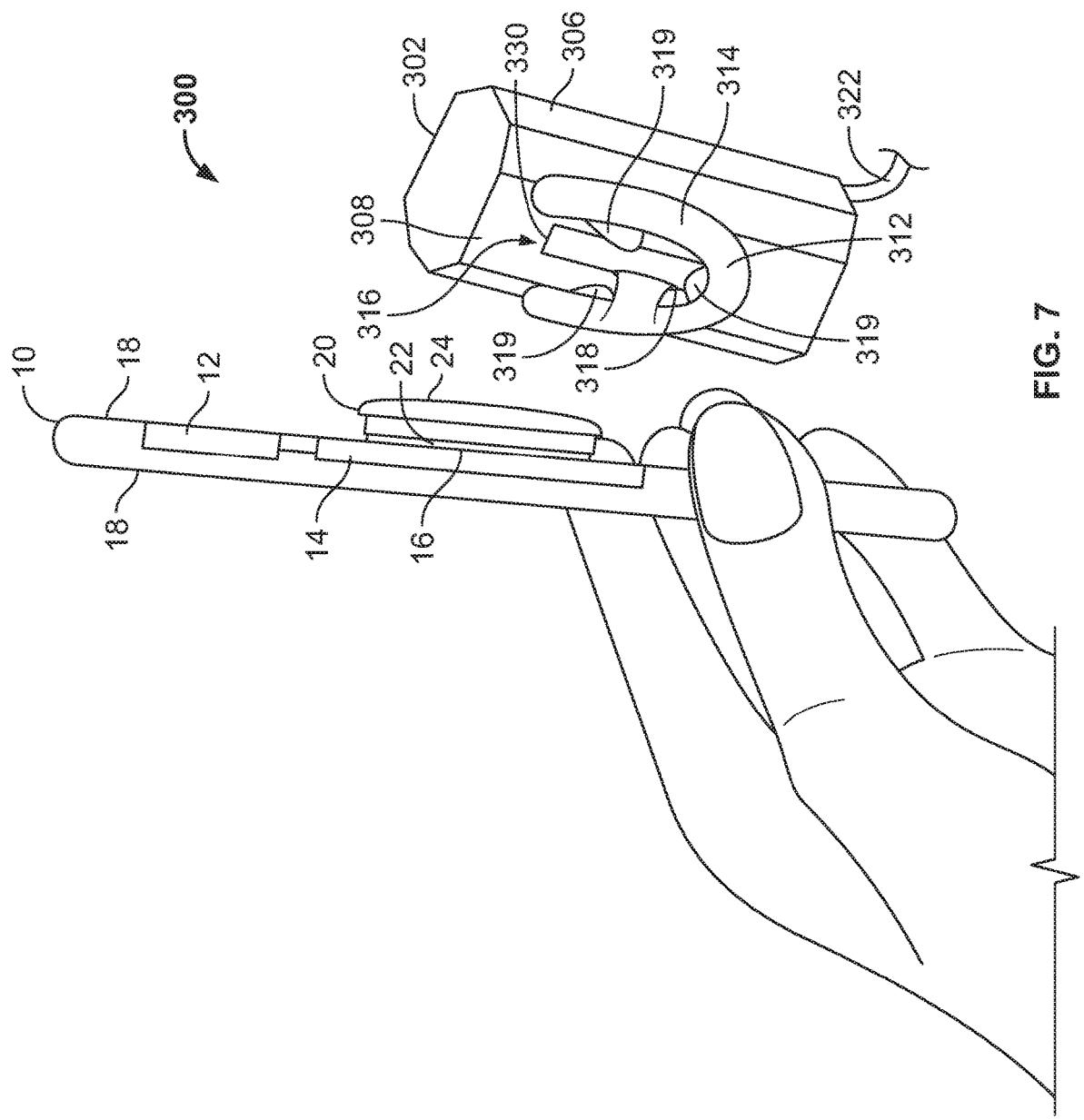
FIG. 7 is a perspective view of an induction charging device suitable for being mounting to a vehicle in accordance with various embodiments.

A second embodiment of an induction charging device 200 is shown in FIGS. 4-6. The induction charging device 200 includes a housing 202 having a base 203 with a bottom wall 204 and one or more upstanding sidewalls 206, and a top wall 208. The base 203 and top wall 208 define an interior 210 for the housing 202. As shown, the top wall 208 includes a recess 212 therein defined by a sidewall 214 and a bottom wall 216. The sidewall 214 can have an inwardly tapering configuration or can extend generally vertical. The top wall 208 further provides a charging surface 218 for reception of the rear surface 18 of the portable electronic device 10 thereon.

So configured, a user can place the electronic device 10 on the charging surface 218 with the attachment 20 aligned with the recess 212. The recess sidewall 214 is sized to give the recess 212 a depth sufficient to fully receive the attachment 20 therein so that the electronic device 10 stably rests on the charging surface 218. For example, the sidewall 214 can be sized to be the same as a depth of the attachment 20 or can be larger than the attachment 20 so that the button 24 is spaced from the recess bottom wall 216 by a distance, such as about 1 mm or about 2 mm or in a range between 0 to about 1 mm. Other ranges can be between about 1 mm to about 2 mm or about 1 mm to about 3 mm. Further, if desired, the charging surface 218 can include a tacky portion 219, which can extend across some, such as around the recess 212 or around a perimeter of the charging surface 218, or all of the charging surface 218 and can be a layer, coating, member, etc. The tacky portion 219 can be a suitable adhesive, including high and low tack adhesive, rubber, or elastomers or other polymers having tacky properties.

The recess 212 can have any suitable configuration, similar to the above described recess 112. For example, the recess 212 can have a circular cross-section or a track-shaped, elongate slot configuration in a plane parallel to the charging surface 218. Additionally, the recess 212 can be larger than the attachment 20 so that a user can move the electronic device 10 around on the charging surface 218.

As shown in FIG. 4, the top wall 208 can be configured to rest on the upstanding sidewalls 206 and, in this form, is removable therefrom. So configured, a user can carry the portable top wall 208 along with the electronic device 10 to charge the power source 12 remote from the base 203, as well as access the interior 210 for storage purposes. For example, a user could store extra attachments 20 in the interior 210. Further, the base 203 can include slots 230 formed in the sidewalls 206 that are configured to receive the top wall 208 therein. As shown, the slots 230 are aligned with one another across the bottom wall 204 and extend at an angle with respect to horizontal to hold the top wall 208 at a convenient viewing angle (FIG. 5). Advantageously, with the attachment 20 received within the recess 212, the top wall 208 can stably hold the electronic device 10 at the angle. For further insurance, however, the slots 230 can be disposed closely adjacent to the adjacent end wall 206 so that if the electronic device 10 slides on the charging surface 218, the device 10 can rest on the end wall 206.

Similar to the above embodiment, as shown in FIG. 6, the induction charging device 200 of this form further includes an electronic assembly 220 having a power cord 222 configured to be coupled to a power source, such as an electrical wall outlet, a car outlet, or the like, a printed circuit board assembly 224, and a transmission coil 226. The components of the electronic assembly 220 can be electrically coupled together by any suitable method, including wires, traces, etc. The transmission coil 226 has a disk-shaped configuration with main surfaces 228 that extend along generally parallel to the charging surface 218 of the top wall 208. To charge the electronic device 10, a user aligns the coil 14 of the device 10 with the coil 226 of the charging device 200 to supply charging power to the power source 12.

As discussed above, at least one dimension of the recess 212 in a plane parallel to the charging surface 218 can be larger than a corresponding dimension of the attachment 20 such that the electronic device 10 can be shifted on the charging surface 218 with the attachment 20 received within the recess 212 to refine the alignment of the transmission coil 226 with the reception coil 14.

In some versions, the circuit board 224 and transmission coil 226 can be mounted within an enclosed housing portion 232 disposed below and around the recess 218. As shown, the coil 226 can be mounted to an interior surface of the recess 212 so that the coil 226 is positioned closely adjacent to the charging surface 218. For example, the coil 226 can be spaced from the charging surface 218 between about 5 mm and about 20 mm, between about 7 mm and about 15 mm, between about 8 mm and about 10 mm, or about 9 mm. The spacing between the coil 226 and the charging surface 218 creates a charging zone adjacent to and spaced from the charging surface 218 to account for the body of the electronic device 10 and any cover secured over the body. For example, the spacing of the coil 226 and charging surface 218 can create a charging zone that extends between about 1 mm to about 6 mm spaced from the charging surface 218. In one form, the charging zone extends between about 10 mm and about 15 mm from the coil 226. The enclosed housing portion 232 can protrude downwardly away from the charging surface 218 and be generally centrally disposed on the top wall 208 and spaced from edges thereof by a flange 234. In this form, the slots 230 in the sidewall 206 can have a width sized to receive the flange 234 therein to hold the top wall 208 at the angle.

If desired, the electronic assembly 220 can include shielding 229 disposed between the coil 226 and the circuit board 224 to protect the circuit board 224 during use. Further, to electrically couple the circuit board 224 and coil 226 to the other components of the electronic assembly 220, the top wall 208 can include an electrical port 236 and the electronic assembly 220 can further include a wire 238 with a plug 240 configured to be inserted into the port 236 to electrically couple the power cord 222 to components disposed within the enclosed housing portion 232 of the top wall 208.

A third embodiment of an induction charging device 300 is shown in FIGS. 7-11 that is suitable for charging and holding the electronic device 10 in a vehicle or other mounted setting. The induction charging device 300 includes a housing 302 having a rear wall 304, one or more sidewalls 306, and a front wall 308. The walls 304, 306, 308 of the housing 302 define an interior 310. As shown, charging device 300 further includes a mount 312 secured or otherwise coupled to the front wall 308. The mount 312 includes a body 314 defining an upwardly opening arcuate recess 316 adjacent to the front wall 308 and a forward opening 318. In some versions, the recess 316 can have a slot configuration sized to receive edges of the button 24 therein. It will be understood, that the mount 312 can have any suitable configuration to receive and retain attachments 20 having a variety of shapes and sizes, including a circular button 24 with a frustoconical sidewall 22 as shown.

With this configuration, the button 24 of the attachment 20 can be slid into the arcuate recess 316 with the tapering body 22 of the attachment 20 can project through the forward opening 318. By retaining the attachment 20 within the mount 312, the charging device 300 effectively holds the electronic device 10 adjacent to the housing 302 at a predetermined distance from the front wall 308 thereof. Further, if desired, the mount 312 can include inwardly projecting retention portions 319 extending adjacent to the recess 316 to grip the edges of the button 24 to retain the attachment 20 within the mount 312. In some approaches, the retention portions 319 can include tacky portions, which can extend across some or all of the exteriors thereof. The tacky portions can be layers, coatings, members, etc., and can be a suitable adhesive, including high and low tack adhesive, rubber, or elastomers or other polymers having tacky properties.

Figure 8:
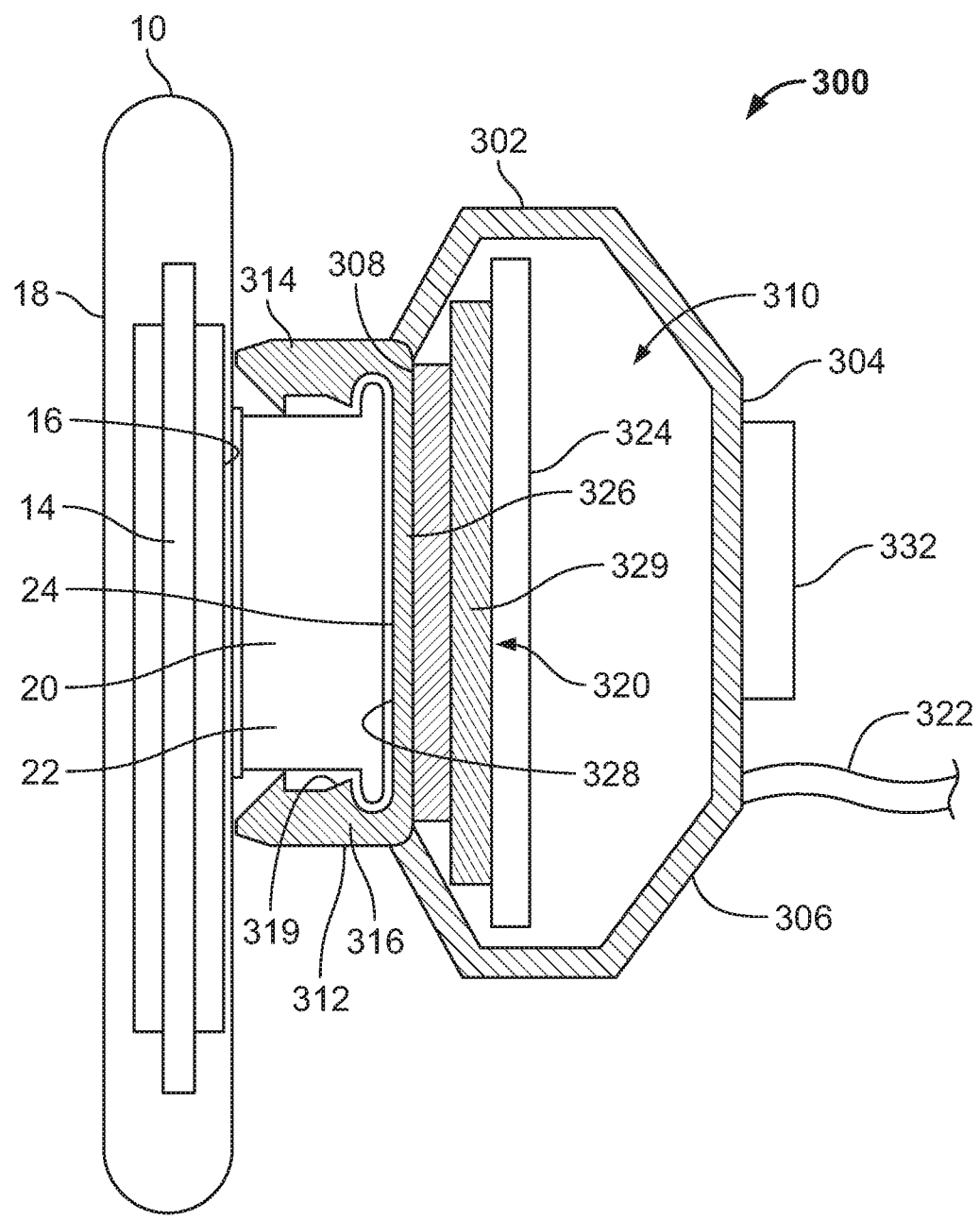
FIG. 8 is a cross-sectional view of the induction charging device of FIG. 7 in accordance with various embodiments.
Figure 9:
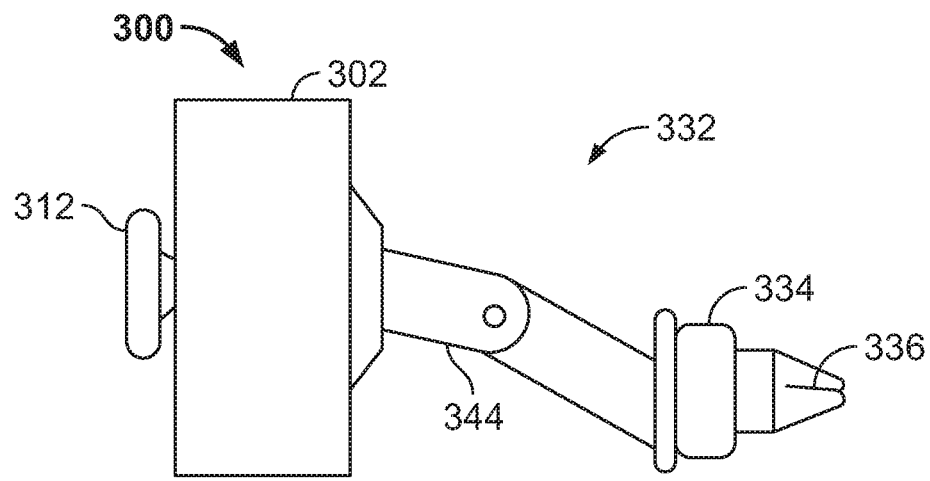
FIG. 9 is a side elevational view of the induction charging device of FIG. 7 with a vent mount attachment in accordance with various embodiments.

Similar to the above embodiments, as shown in FIG. 8, the induction charging device 300 of this form further includes an electronic assembly 320 having a power cord 322 configured to be coupled to a power source, such as an electrical wall outlet, a car outlet, or the like, a printed circuit board assembly 324, and a transmission coil 326. The components of the electronic assembly 320 can be electrically coupled together by any suitable method, including wires, traces, etc. The transmission coil 326 has a disk-shaped configuration with main surfaces 328 that extend along generally parallel to the front wall 308. To charge the electronic device 10, a user inserts the attachment 20 into the mount 312 to align the coil 14 of the device 10 with the coil 326 of the charging device 300 to supply charging power to the power source 12.

As discussed above, alignment of the coils 14, 326 can increase the effectiveness of charging the power source 12. Further, users may secure the attachment 20 at various heights along the device 10. As such, if desired, the mount 312 can be secured to the front 308 within a track 330 having friction or snap-fit connections with the mount 312 so that a user can position the device 10 at a desired vertical location with respect to the housing 302 to better align the coils 14, 326.

In some versions, the circuit board 324 and transmission coil 326 can be mounted within the housing interior 310 to an interior surface of the front wall 308 so that the coil 326 is positioned closely adjacent to the mount 312. For example, the coil 326 can be spaced from a front surface of the mount 312 between about 5 mm and about 20 mm, between about 7 mm and about 15 mm, between about 8 mm and about 10 mm, or about 9 mm. The spacing between the coil 326 and the front surface of the mount 312 creates a charging zone adjacent to and spaced from the mount 312 to account for the body of the electronic device 10 and any cover secured over the body. For example, the spacing of the coil 326 and front surface of the mount 312 can create a charging zone that extends between about 1 mm to about 6 mm spaced from the front surface of the mount 312. In one form, the charging zone extends between about 10 mm and about 15 mm from the front surface of the mount 312. If desired, the electronic assembly 320 can include shielding 329 disposed between the coil 326 and the circuit board 324 to protect the circuit board 324 during use.

Figure 10:
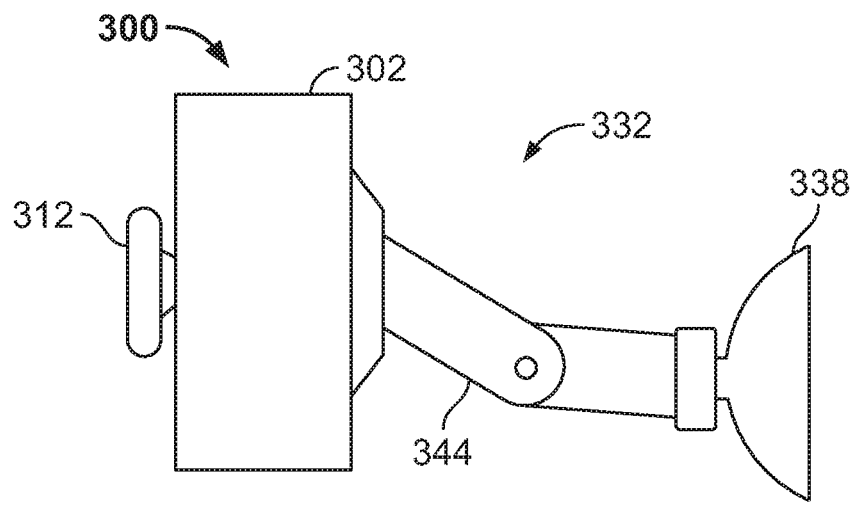
FIG. 10 is a side elevational view of the induction charging device of FIG. 7 with a suction cup attachment in accordance with various embodiments.
Figure 11:
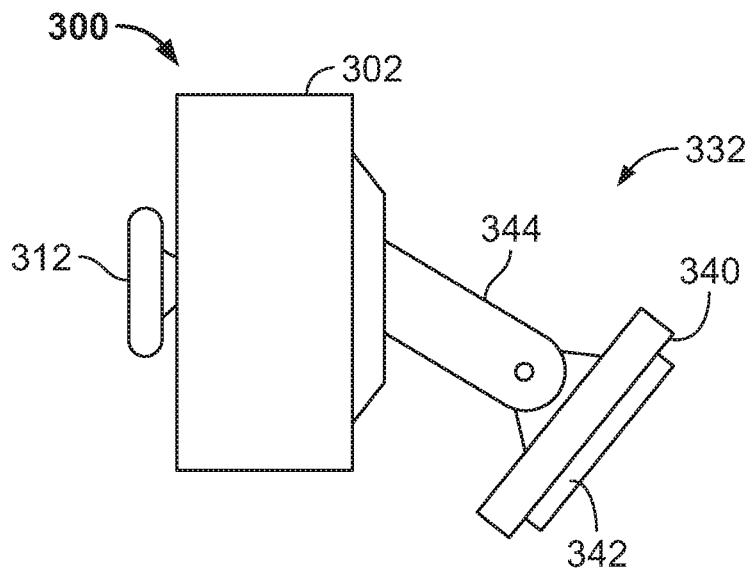
FIG. 11 is a side elevational view of the induction charging device of FIG. 7 with a tacky attachment in accordance with various embodiments.

As discussed above, the charging device 300 can be suitable to be secured to a portion of a vehicle. More specifically, the charging device 300 can include an attachment device 332 secured or otherwise coupled to the rear wall 304 of the housing 302. The attachment device 332 can take any suitable form. In a first form shown in FIG. 9, the attachment device 332 can be a vent attachment 334 having a forked configuration with one or more slots 336 sized to receive a fan of a vehicle vent therein. In a second form as shown in FIG. 10, the attachment device 332 can be a suction cup 338 capable of being mounted to any suitable surface. In a third form as shown in FIG. 11, the attachment device 332 can be a planar or curved surface 340 having a tacky portion or portions 342, which can extend across some or all of the surface 340. The tacky portions 342 can be layers, coatings, members, etc., and can be a suitable adhesive, including high and low tack adhesive, rubber, or elastomers or other polymers having tacky properties. The tacky portions 342 can grip a suitable surface of a vehicle to hold the electronic device 10 in a desired orientation and position. In some versions, the attachment device 332 of any of the above forms can further include an adjustable arm 344 having hinged or pivoting portions so that a user can move the position and orientation of the mount 312 with respect to a mounting surface on the vehicle.

The coils discussed herein can be made of suitable conductive material, such as a suitable metal. Further, the charging devices 100, 200, 300 can utilize any suitable standard, including Qi.

In some instances, the expandable grip accessory of the current disclosure may be in the form of a commercially available grip and stand product such as that available on www.popsockets.com. For example, U.S. Pat. No. 8,560,031, filed on Feb. 23, 2012; U.S. Pat. No. 9,970,589, filed on Nov. 9, 2017; U.S. application Ser. No. 15/615,900, filed on Jun. 7, 2017; U.S. application Ser. No. 15/679,934, filed on Aug. 17, 2017; U.S. application Ser. No. 15/803,410, filed on Nov. 3, 2017; U.S. application Ser. No. 15/808,076, filed on Nov. 9, 2017; U.S. application Ser. No. 15/864,402, filed on Jan. 8, 2018; U.S. application Ser. No. 15/864,509, filed on Jan. 8, 2018; U.S. application Ser. No. 15/906,920, filed on Feb. 27, 2018; U.S. application Ser. No. 15/922,601, filed on Mar. 15, 2018; U.S. application Ser. No. 15/952,025, filed on Apr. 12, 2018; U.S. application Ser. No. 15/993,458, filed on May 30, 2018; and U.S. application Ser. No. 16/001,723, filed on Jun. 6, 2018 each describe suitable expandable grip and stand products, which also incorporate collapsible mechanisms, the entirety of each being hereby incorporated herein by reference.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. As used herein, the term "about" can be considered to encompass a range of 0.5 mm above and below the identified measurement. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. An induction charging apparatus for a portable electronic device having a reception coil coupled to a power source and having an outwardly projecting attachment mounted thereon, the charging apparatus comprising:
    a housing defining an interior and having a wall with an outwardly facing charging surface configured to receive the portable electronic device thereon for charging the power source thereof;
    a recess in the wall sized to receive the attachment therein with the portable electronic device disposed on the charging surface;
    a charging assembly disposed within the housing, the charging assembly including a transmission coil having a main surface disposed below the recess and extending generally parallel with the outwardly facing charging surface, the recess receiving the attachment therein configured to sufficiently align the transmission coil with the reception coil to thereby charge the power source of the portable electronic device.

2. The charging apparatus of claim 1, wherein at least one dimension of the recess in a plane parallel to the charging surface is larger than a corresponding dimension of the attachment such that the portable electronic device can be shifted on the charging surface with the attachment received within the recess to refine the alignment of the transmission coil with the reception coil.

3. The charging apparatus of claim 2, wherein the recess has a circular shaped cross-section in the plane parallel to the charging surface.

4. The charging apparatus of claim 1, wherein the recess includes a bottom wall and a depth of the recess between the charging surface and the bottom wall is sized to receive the attachment in the recess with the attachment spaced from the bottom wall.

5. The charging apparatus of claim 1, wherein the transmission coil is spaced from the charging surface by a predetermined distance to create a charging zone extending between about 10 mm and about 15 mm from the transmission coil.

6. The charging apparatus of claim 1, wherein the transmission coil is mounted to an interior surface of the recess.

7. The charging apparatus of claim 1, wherein the charging surface further comprises a tacky portion.

* * * * *